(12) United States Patent
Sarikaya

(10) Patent No.: US 8,228,843 B2
(45) Date of Patent: Jul. 24, 2012

(54) INTERNET PROTOCOL VERSION 4 SUPPORT FOR PROXY MOBILE INTERNET PROTOCOL VERSION 6 ROUTE OPTIMIZATION PROTOCOL

(75) Inventor: Behcet Sarikaya, Wylie, TX (US)

(73) Assignee: Futurewei Technologies, Inc., Plano, TX (US)

( * ) Notice: Subject to any disclaimer, the term of this patent is extended or adjusted under 35 U.S.C. 154(b) by 704 days.

(21) Appl. No.: 12/268,317

(22) Filed: Nov. 10, 2008

(65) Prior Publication Data

US 2009/0122750 A1 May 14, 2009

Related U.S. Application Data

(60) Provisional application No. 60/987,354, filed on Nov. 12, 2007.

(51) Int. Cl.
*H04W 4/00* (2009.01)
*H04W 36/00* (2009.01)
*H04L 12/28* (2006.01)

(52) U.S. Cl. ........ 370/328; 370/329; 370/331; 370/338; 370/389; 455/436

(58) Field of Classification Search .......... 370/328–503; 455/436–444
See application file for complete search history.

(56) References Cited

U.S. PATENT DOCUMENTS

| | | | | |
|---|---|---|---|---|
| 6,981,047 B2* | 12/2005 | Hanson et al. | ................. | 709/227 |
| 7,136,645 B2* | 11/2006 | Hanson et al. | ............. | 455/435.1 |
| 7,293,107 B1* | 11/2007 | Hanson et al. | ................. | 709/245 |
| 7,574,208 B2* | 8/2009 | Hanson et al. | ............. | 455/435.1 |
| 7,644,171 B2* | 1/2010 | Sturniolo et al. | ............. | 709/230 |
| 7,778,260 B2* | 8/2010 | Sturniolo et al. | ............. | 370/401 |
| 7,839,825 B2* | 11/2010 | Chen | ............................ | 370/331 |
| 8,102,815 B2* | 1/2012 | Krishnan | ....................... | 370/331 |
| 2002/0098840 A1* | 7/2002 | Hanson et al. | ................. | 455/435 |
| 2006/0009213 A1* | 1/2006 | Sturniolo et al. | ........... | 455/426.1 |
| 2006/0123079 A1* | 6/2006 | Sturniolo et al. | ............. | 709/203 |

(Continued)

FOREIGN PATENT DOCUMENTS

CN 1972310 A 5/2007

OTHER PUBLICATIONS

Arkko, J., "Enhanced Route Optimization for Mobile IPv6," IETF Network Working Group, RFC 4866, May 2007, 51 pgs.

(Continued)

*Primary Examiner* — Ayaz Sheikh
*Assistant Examiner* — Venkatesh Haliyur
(74) *Attorney, Agent, or Firm* — Conley Rose, P.C.; Grant Rodolph; Brandt Howell

(57) ABSTRACT

A network component comprising at least one processor configured to implement a method comprising promoting an optimization of a communications route associated with a mobile node (MN) and a correspondent node (CN) using Internet Protocol version 4 (IPv4) packets is disclosed. Also disclosed is a network comprising a mobility access gateway (MAG) in communication with a MN, and a CN in communication with the MAG and that desires to communicate with the MN, wherein a communications route between the MN and the CN is optimized using IPv4 signaling. Included is a method comprising promoting an optimization of a communications route between a MN and a CN using IPv4 signaling. Standalone CNs and CNs under a MAG embodiments are supported.

15 Claims, 5 Drawing Sheets

U.S. PATENT DOCUMENTS

| | | | |
|---|---|---|---|
| 2006/0198345 A1* | 9/2006 | Chen | 370/338 |
| 2007/0038759 A1* | 2/2007 | Hanson et al. | 709/227 |
| 2007/0258424 A1 | 11/2007 | Wable et al. | |
| 2009/0016364 A1* | 1/2009 | Krishnan | 370/401 |
| 2009/0073935 A1* | 3/2009 | Xia et al. | 370/331 |
| 2009/0122750 A1* | 5/2009 | Sarikaya | 370/328 |
| 2009/0168698 A1* | 7/2009 | Weniger et al. | 370/328 |
| 2010/0046419 A1* | 2/2010 | Hirano et al. | 370/315 |
| 2010/0174828 A1* | 7/2010 | Jeong et al. | 709/238 |
| 2010/0208691 A1* | 8/2010 | Toyokawa | 370/331 |
| 2010/0208706 A1* | 8/2010 | Hirano et al. | 370/332 |
| 2010/0272062 A1* | 10/2010 | Velev et al. | 370/331 |
| 2010/0284331 A1* | 11/2010 | Weniger et al. | 370/328 |
| 2010/0296481 A1* | 11/2010 | Weniger et al. | 370/331 |
| 2011/0122815 A1* | 5/2011 | Velev et al. | 370/328 |

OTHER PUBLICATIONS

Aura, T., "Cryptographically Generated Addresses (CGA)," IETF Network Working Group, RFC 3972, Mar. 2005, 21 pgs.

Bradner, S., "Key Words for use in RFCs to Indicate Requirement Levels," IETF Network Working Group, RFC 2119, Mar. 1997, 3 pgs.

Gundavelli, S., et al., "Proxy Mobile IPv6," IETF Network Working Group, RFC 5213, Aug. 2008, 8 pgs.

Gundavelli, S., et al., "Proxy Mobile IPv6," IEFT NetLMM Working Group, draft-ietf-netlmm-proxymip6-07.txt, Nov. 4, 2007, 73 pgs.

Johnson, D., et al., "Mobility Support in IPv6," IETF Network Working Group, RFC 3775, Jun. 2004, 155 pgs.

Nikander, P., et al., "Mobile IP Version 6 Route Optimization Security Design Background," IETF Network Working Group, RFC 4225, Dec. 2005, 35 pgs.

Perkins, C., "Security Mobile IPv6 Route Optimization Using a Static Shared Key," IETF Network Working Group, RFC 4449, Jun. 2006, 7 pgs.

Soliman, Hesham, "Mobile IPv6 Support for Dual Stack Hosts and Routers (DSMIPv6)," draft-ietf-mip6-nemo-v4traversal-06.txt, MIP6 Working Group, Nov. 2007, 56 pgs.

Wakikawa, R., et al., "IPv4 Support for Proxy Mobile IPv6," IETF NetLMM Working Group, draft-ietf-netlmm-pmip6-ipv4-support-01.txt, Jul. 9, 2007, 24 pgs.

Jeong, S., et al., "Route Optimization Support for Proxy Mobile IPv6 (PMIPv6)," Network Working Group, Internet Draft, draft-jeong-netlmm-ro-support-for-pmip6-00.txt, Jul. 2, 2007, 13 pages.

Wakikawa, R., et al., "IPv4 Support for Proxy Mobile IPv6," NETLMM Working Group, Internet Draft, draft-ietf-netlmm-pmip6-ipv4-support-00.txt, May 2007, 25 pages.

Qin, A., et al., "PMIPv6 Route Optimization Protocol," Network Working Group, Internet Draft, draft-qin-mipshop-pmipro-00.txt, Feb. 25, 2007, 24 pages.

Foreign Communication From a Related Counterpart Application—International Search Report and Written Opinion, PCT/CN2008/073029, Jan. 22, 2009, 9 pages.

Sarikaya, B., et. al., "PMIPv6 Route Optimization Protocol," draft-qin-mipshop-pmipro-01.txt, Nov. 14, 2007, 24 pages.

Sarikaya, B., et. al., "PMIPv6 Route Optimization Protocol," draft-qin-netlmm-pmippro-00.txt, Feb. 11, 2008, 24 pages.

Wakikawa, et al., "IPv4 Support for Proxy Mobile IPv6," draft-ietf-netlmm-pmip6-ipv4-support-05.txt, Sep. 23, 2008, 48 pages.

Gundavelli, Ed., et al., "Proxy Mobile IPv6," draft-ietf-netlmm-proxymip6-18.txt, May 30, 2008, 92 pages.

Solimna, Ed., et al., "Mobile IPv6 Support for Dual Stack Hosts and Routers (DSMIPv6)," draft-ietf-mip6-nemo-v4traversal-05.txt, Jul. 2007, 28 pages.

Gundavelli, et al., "Proxy Mobile IPv6," draft-sgundave-mip6-proxymip6-01.txt, Jan. 5, 2007, 40 pages.

Sarikaya, B., et. al., "PMIPv6 Route Optimization Protocol," draft-qin-mipshop-pmipro-01.bd, Nov. 14, 2007, 24 pages.

Sarikaya, B., et. al., "PMIPv6 Route Optimization Protocol," draft-qin-mipshop-pmipro-00.txt, Feb. 11, 2008, 24 pages.

Wakikawa, R., et. al., "IPv4 Support for Proxy Mobile IPv6," draft-ietf-netlmm-pmip6-ipv4-support-05.txt, Sep. 23, 2008, 48 pages.

Gundavelli, S., Ed., et al., "Proxy Mobile IPv6," draft-ietf-netlmm-proxymip6-18.txt, May30, 2008, 92 pages.

Soliman, H., Ed., "Mobile IPv6 Support for Dual Stack Hosts and Routers (DSMIPv6)," draft-ietf-mip6-nemo-v4traversal-05.txt, Jul. 2007, 28 pages.

Gundavelli, S., et al., "Proxy Mobile IPv6," draft-sgundave-mip6-proxymip6-01.txt, Jan. 5, 2007, 40 pages.

Wakikawa, R., Ed., et al., "IPv4 Support for Proxy Mobile IPv6," draft-ietf-netlmm-pmip6-ipv4-support-02.txt, Nov. 19, 2007, 35 pages.

Soliman, H., Ed., "Mobile IPv6 Support for Dual Stack Hosts and Routers," draft-ietf-mext-nemo-v4traversal-06.txt, 51 pages, Jun. 2009.

* cited by examiner

INTERNET PROTOCOL VERSION 4 SUPPORT FOR PROXY MOBILE INTERNET PROTOCOL VERSION 6 ROUTE OPTIMIZATION PROTOCOL

CROSS-REFERENCE TO RELATED APPLICATIONS

This application claims priority to U.S. Provisional Application Ser. No. 60/987,354 filed Nov. 12, 2007 by Qin et al. and entitled "PMIPv6 Route Optimization Protocol," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In modern wireless access networks, mobile nodes (MNs) allow users to freely move between access points without the user having to configure the MN for each access point. Specifically, when the MN reaches the coverage limit of one access point, the access point hands over the MN to an adjacent access point, typically without any disruption to the MN's service. In Internet Protocol version 6 (IPv6) networks, a process called proxy mobile IPv6 defines a relatively orderly and efficient network-based method for handing off the MN between adjacent access points. Specifically, proxy mobile IPv6 allows a mobility access gateway (MAG) and a local mobility anchor (LMA) track the movements of the MN and initiate the required mobility signaling on behalf of the MN. In addition, the MN uses the same IPv6 home address before and after handover, and the MN not participate in the handover or any other mobility signaling. Proxy mobile IPv6 has been recently extended to define a route optimization procedure. Unfortunately, the proxy mobile IPv6 route optimization protocol does not support route optimization via Internet Protocol version 4 (IPv4), and thus cannot be implemented using IPv4 signaling.

SUMMARY

In a first embodiment, the disclosure includes a network component comprising at least one processor configured to implement a method comprising promoting an optimization of a communications route associated with a MN and a correspondent node (CN) using IPv4 packets.

In a second embodiment, the disclosure includes a network comprising a mobility access gateway (MAG) in communication with a MN, and a CN in communication with the MAG and that desires to communicate with the MN, wherein a communications route between the MN and the CN is optimized using IPv4 signaling.

In a third embodiment, the disclosure includes a method comprising promoting an optimization of a communications route between a MN and a CN using IPv4 signaling.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method and system for implementing IPv6 route optimization using components that do not support IPv6, such as IPv4 components. The methods include a PHoT procedure and a PCoT procedure that may allow the CN to verify the reachability of the MN's home address (HoA) and care-of address (CoA) using IPv4 signaling using the optimized route. Specifically, the PHoT and PCoT procedures may be implemented between the MN's MAG and the CN or the CN's MAG.

Figure 1:
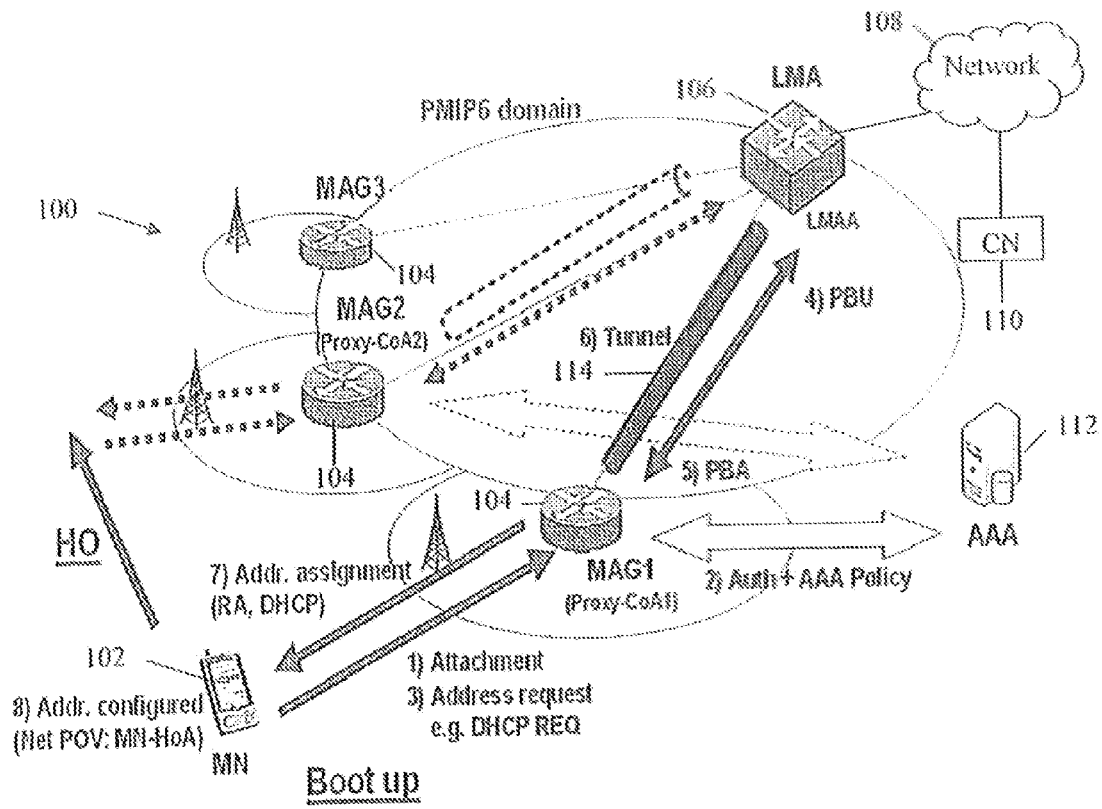
FIG. 1 is a schematic diagram of an embodiment of a wireless system showing the operation of Proxy Mobile IPv6.

FIG. 1 illustrates an embodiment of a wireless system 100. The system 100 may comprise a MN 102, a plurality of MAGs 104, a LMA 106, a network 108, a CN 110, and an authentication, authorization, and accounting (AAA) server 112, all of which are in communication with each other as shown in FIG. 1. The system may be an Internet Protocol (IP) system, such as an IPv4 system, an IPv6 system as shown in FIG. 1, or combinations thereof. Alternatively, the system may be any other type of wireless system implementing any other suitable protocol. It will be appreciated that FIG. 1 is only one embodiment of the system 100, and that the system 100 may comprise additional components including additional MNs 102, MAGs 104, LMAs 106, networks 108, CNs 110, AAA servers 112, or combinations thereof.

The MN 102 may be any device or component that uses the MAG 104 and/or LMA 106 to communicate with the CN 110. Typically, the MN 102 is a mobile user-oriented device that communicates wirelessly with the LMA 106 via the MAG 104, but the MN 102 should not be limited as such. For example, the MNs 102 may be cellular phones, notebook computers, personal digital assistants (PDAs), or any other wireless devices. Alternatively, the MNs 102 may be a component that exchanges data between the system 100 and an external network, such as a wireless router.

The MAGs 104 may be any devices or components that exchange data between the MN 102 and the LMA 106. The MAGs 104 may be routers in that they forward packets that are not explicitly addressed to themselves to other nodes. The MAGs 104 may also perform mobility signaling with the LMA 106 and other MAGs 104 on behalf of MN 102 and/or perform mobility signaling with the MN 102 on behalf of the LMA 106. The MAGs 104 may reside on the access link where the MN 102 is anchored and perform mobility management on behalf of a MN 102. As such, the MAGs 104 may be responsible for detecting the MN's 102 movements on the access links and for sending binding registrations to the LMA 106. In some embodiments, the MAGs 104 may comprise or may be part of a base transceiver station (BTS), a base station controller, or the like, and/or may use such to communicate with the MN 102.

The LMA 106 may be any device or component that allows the MN 102 to communicate with the network 108 and/or the CN 110. The LMA 106 may communicate with the MNs 102 through the MAGs 104 or may communicate directly with the MNs 102. The LMA 106 may be a router in that it forwards packets that are not explicitly addressed to the LMA 106 to other nodes. The LMA 106 may be responsible for maintaining the MN's 102 reachability state and may be the topological anchor point for the MN's 102 home network prefix. In an embodiment, the LMA 106 may comprise or be a part of a Home Agent. As such, the LMA 106 may act as a dynamic host configuration protocol (DHCP) client and/or an AAA client, and may comprise an address cache. In addition, the LMA 106 may handle IP routing for the MNs 102 that may roam into a foreign network.

In an embodiment, the network 108 may be any device, component, or network that exchanges data between the LMA 106 and the CN 110. For example, the network 108 may be a Packet Switched Network (PSN), such as a local area network (LAN), a metropolitan area network (MAN), a wide area network (WAN), an intranet, or the Internet. Alternatively, the network 108 may be a circuit switched network, such as a public switched telephone network (PSTN), or any other network.

The CN 110 may be any device or component that desires to communicate with the MN 102 or with which the MN 102 desires to communicate. The CN 110 may be another MN or may be a fixed device. It will be appreciated that while the CN 110 shown in FIG. 1 is not in the same LMA or MAG domain as the MN 102, in some embodiments the CN 110 may be in the same LMA and/or MAG domain as the MN 102.

The AAA server 112 may be any device, component, or network that comprises authentication, authorization, and/or accounting data and/or implements authentication, authorization, and/or accounting functions. The AAA server 112 may communicate with the MN 102, MAGs 104, and/or LMA 106 using any suitable protocol, including IP, RADIUS, and DIAMETER.

The components described above may communicate with each other via fixed and/or wireless links using a variety of technologies. The wireless links may be created dynamically when the MN 102 attaches to the LMA 106 directly or through the MAGs 104. The wireless links may be implemented using a multiple access technology, such as Code Division Multiple Access (CDMA), Orthogonal Frequency Division Multiple Access (OFDMA), or Time Division Multiple Access (TDMA). Examples of suitable wireless link technologies include the Internet Engineering Task Force (IETF), Worldwide Interoperability for Microwave Access (WiMAX), Wireless Fidelity (WiFi), Wideband CDMA (WCDMA), Global System for Mobile communications (GSM), Enhanced Data for GSM Evolution (EDGE), Universal Mobile Telecommunication Systems (UMTS), Third Generation Partnership Project (3GPP), Third Generation Partnership Project 2 (3GPP2), Advanced Mobile Phone Service (AMPS), one of the Institute of Electrical and Electronic Engineers (IEEE) 802 wireless networks, such as 802.16d/e, or any other wireless network. The remaining components may be coupled together via fixed links, such as electrical or optical links. Examples of suitable fixed link technologies include IP, Ethernet, Asynchronous Transfer Mode (ATM), Frame Relay, Synchronous Optical Network (SONET), and Synchronous Digital Hierarchy (SDH). The fixed and wireless links may have a fixed bandwidth such that a fixed amount of data is transported over the link, or may have a variable-sized bandwidth.

When the system 100 is a Proxy Mobile IPv6 system, the system 100 may implement an attachment and handover procedure to ensure constant communications between the MN 102 and the CN 110. Briefly, the attachment procedure comprises attachment between the MN 102 and a MAG 104. Next, the MAG 104 authenticates the MN 102 using an AAA policy obtained from the AAA server 112. The MN 102 then requests an IP address from the MAG 104, for example using a DHCP request, which causes a proxy binding update (PBU) and proxy binding acknowledgement (PBA or PBAck) procedure to occur between the MAG 104 and the LMA 106. A communications tunnel 114 is subsequently formed between the MAG 104 and the LMA 106, and the IP Address is conveyed to the MN 102, for example using DHCP. The MN 102 then configures the MN's IP address, known at its HoA, and commences communications with the CN 110. Communications from the CN 110 to the MN 102 are first routed to the LMA 106, then to the proxy CoA at the MAG 104, and then to the HoA in the MN 102. When the MN 102 changes locations sufficient to change the MAG 104 with which it communicates, at least part of the above process may be repeated. Consequently, the communications tunnel 114 may be torn down and a new tunnel may be constructed between the LMA 106 and the new MAG 104 in communication with the MN 102. The MN 102 may be unaware of any of the signaling that occurs between the MAGs 104 and the LMA 106.

In Mobile IPv6, the routing of communications between the CN 110 and the MN 102 can be less than optimal because it is not the most direct path between the CN 110 and the MN 102. Specifically, packets from the CN 110 to the MN 102 may first go to the LMA 106 and then are directly routed to the MN 102 via the MAG 104. In addition, packets from the MN 102 to the CN 110 may be theoretically routed directly to the CN 110, however in practice these packets are routed through the LMA 104 due to ingress filtering. As such, a return routability procedure has been created to facility direct packet routing between the CN 110 and the MN 102.

Figure 2:
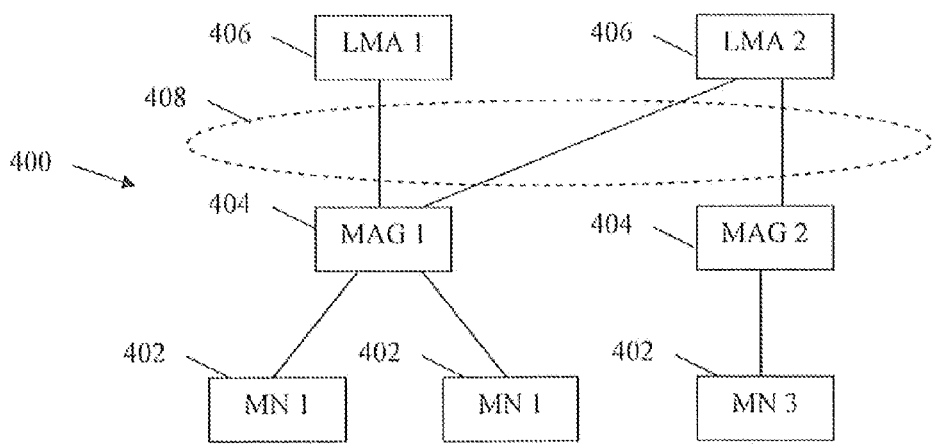
FIG. 2 is a schematic diagram of an embodiment showing the operation of Proxy Mobile IPv6 support of an IPv4 network.

While the above procedures are useful in IPv6 networks, not all networks support IPv6. Specifically, many existing MNs and network components are only configured to support IPv4, and there may be little need or desire to replace or upgrade them to support IPv6. FIG. 2 is an embodiment of such an IPv4 network 400. The network 400 comprises a plurality of MNs 402, MAGs 404, and LMAs 406 in communication with each other as shown in FIG. 2. The MNs 402, MAGs 404, and LMAs 406 may be substantially the same as the MN 102, MAGs 104, and LMA 106, respectively, described above. However, the communications between the LMAs 406 and the MAGS 404 (and perhaps other components) may be implemented using IPv4 instead of IPv6, as indicated by the dashed oval 408. As such, the LMAs 406 may be configured with IPv4 addresses, such as IPv4-LMAA1 for LMA 1 and IPv4-LMAA2 for LMA 2. Similarly, the MAGs 404 may be configured with IPv4 addresses, such as IPv4-Proxy-CoA1 for MAG 1 and IPv4-Proxy-CoA2 for MAG 2. Finally, the MNs 402 may also be IPv4 components, and as such may be configured with IPv4 addresses, such as IPv4-MN-HoA1 for MN 1, IPv4-MN-HoA2 for MN 2, and IPv4-MN-HoA3 for MN 3.

Figure 3:
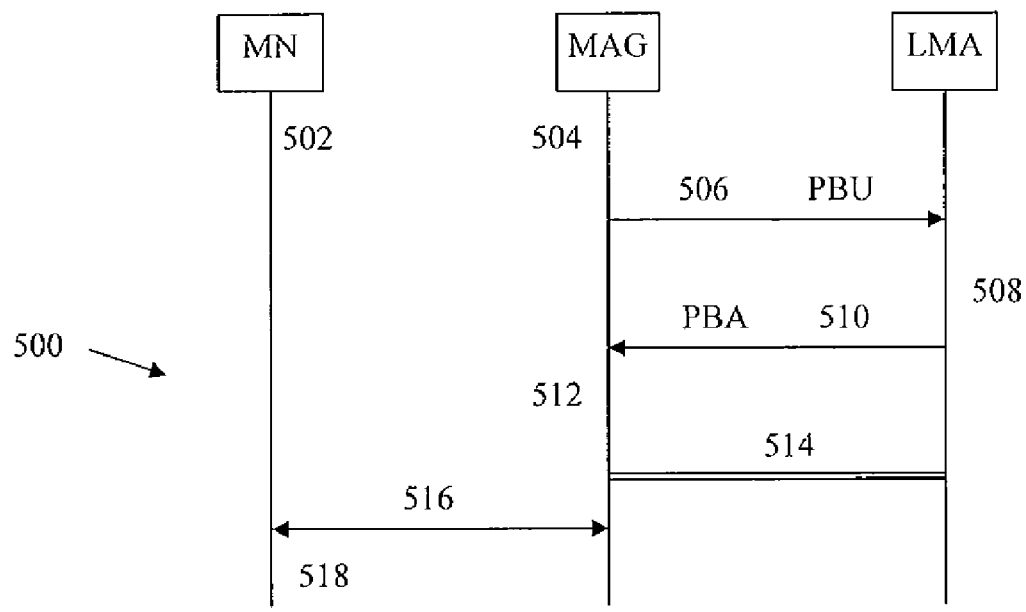
FIG. 3 is a protocol diagram of an embodiment of an IPv4 attachment procedure.

FIG. 3 illustrates an embodiment of an attachment procedure 500 that may be implemented in IPv4 networks. The attachment procedure 500 may begin when a MN attaches to a MAG at 502. Next, the MAG may interface with the AAA server at 504, for example to authenticate the MN, obtain an AAA profile for the MN, and/or obtain an AAA policy. The MAG may then send a PBU message to the LMA at 506. Upon acceptance of the PBU message, the LMA may allocate an IPv4 HoA to the MN, create a binding cache entry (BCE), and begin to set up a tunnel to the MAG at 508. The LMA may then send a PBA message to the MAG at 510. Upon acceptance of the PBA message, the MAG may complete the setup of the tunnel and any other routing details at 512. Step 514 indicates the establishment of the bi-directional tunnel between the LMA and the MAG. The MAG and the MN may then complete a DHCP message exchange at 516, after which the MN may configure its IPv4 address at 518.

In IPv6 networks, once a MN enters a Proxy Mobile IPv6 domain the MAG may perform the mobility related signaling on behalf of the MN. As such, the MAG may determine when to optimize the route paths between the MNs and the CNs according to some policy. The policy may be stationary in user profiles or dynamically created or maintained, and may be pre-configured or obtained by the MAG from an AAA infrastructure or a policy function infrastructure. When the MAG makes a decision that a MN-CN combination needs route optimization, the MAG may initiate a PHoT procedure, which allows the CN to verify the reachability of the MN's HoA using IPv4 signaling and/or without assistance from the MN. The CNs may also need to verify the reachability of CoA. In such a case, a PCoT init (PCoTI) message may be piggybacked onto a PBU message that is sent by the MAG on behalf of the MN to register with the CN.

Figure 4:
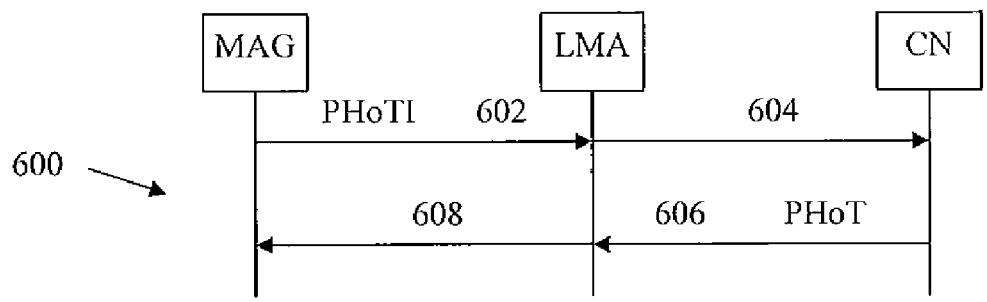
FIG. 4 is a protocol diagram of an embodiment of a Proxy Home Test (PHoT) procedure for a MN's MAG communicating with a CN.

FIG. 4 illustrates an embodiment of a PHoT procedure 600, which may be used to validate the MN's HoA using IPv4 signaling. The PHoT procedure 600 differs from previous Home Test (HoT) procedures in that the MAG, not the MN, is the initiator and recipient of the signaling. As such, the MAG may imitate the MN's HoT signaling. The PHoT procedure 600 may begin when the MAG sends a PHoTI message to the LMA at 602, for example using the tunnel between the MAG and the LMA. The PHoTI message may comprise two IPv4 headers. The first IPv4 header may comprise the CN's IPv4 address as the destination address and the MN's IPv4 HoA as the source address. For example and with reference to FIG. 2, if MN 1 is the MN and MN 3 is the CN, then the destination address would be IPv4-MN-HoA3 and the source address would be IPv4-MN-HoA1. The second IPv4 header may comprise the LMA's IPv4 address as the destination address and the MAG's egress interface IPv4 address as the source address. For example and again referring to FIG. 2, if MAG 1 is the MN's MAG and LMA 2 is the LMA, then the destination address would be IPv4-LMAA2 and the source address would be IPv4-Proxy-CoA1. Upon receipt of the PHoTI message, the LMA may remove the second header from the PHOTI message, and then send the PHoTI message to the CN at 604. The CN responds by sending a PHoT message to the LMA at 606. Specifically, the PHoT message may be sent to the MN's HoA as an IPv4 packet, and as such the CN may add an IPv4 header to the PHoT message prior to sending it. The LMA forwards the PHoT message to the MAG at 608, where it is processed rather than being forwarded to the MN. In an embodiment, the PHoT message may comprise the permanent home keygen token. A keygen token may be a number supplied by the CN that enables the MN to compute the necessary binding management key (Kbm) for authorizing a BU. A home keygen token may be a keygen token sent by the CN in a PHoT message, and may be either temporary or permanent. Similarly, a care-of keygen token may be a keygen token sent by the CN in a CoT message, and may be either temporary or permanent.

Figure 5:
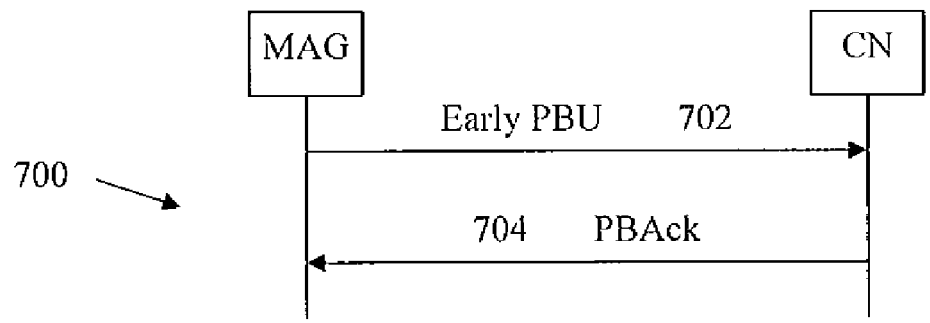
FIG. 5 is a protocol diagram of an embodiment of a Proxy Care-of Test (PCoT) procedure for a MN's MAG communicating with a CN.

FIG. 5 illustrates an embodiment of a PCoT procedure 700, which may be used to validate the MN's CoA using IPv4 signaling. The PCoT procedure 700 differs from previous Care-of Test (CoT) procedures in that the MAG, not the MN, is the initiator and recipient of the signaling. As such, the MAG may imitate the MN's CoT signaling, which may be piggybacked onto the PBU signaling. For example, the PHoT procedure 700 may begin when the MAG sends an early PBU message to the CN at 702. The early PBU may not comprise the care-of keygen token described above, but may comprise a CoT init (CoTI) option, a HoA option, the Cryptographically Generated Address (CGA) parameters, and/or a signature option. The MAG may calculate the CGA parameters and signature option using the MN's HoA. For IPv4 MNs, the HoA may be a 128-bit value that may comprise the home network prefix (HNP) assigned by LMA as the leftmost 64 bits (e.g. the subnet prefix) and the interface identifier as the rightmost 64 bits. The interface identifier bits can be obtained randomly or from the MN's layer 2 address, e.g. the MN's Medium Access Control (MAC) address. The MAG may download the MN's public and private keys from the AAA server during access authentication, and use the MN's public and private keys to calculate the CGA parameters and signature option.

The PCoT procedure 700 may be implemented prior to, simultaneous with, or subsequent to the PHoT procedure 600. As such, the MAG may or may not have the permanent home keygen token when implementing the PCoT procedure 700. If MAG only has the temporary home keygen token instead of the permanent home keygen token, the MAG may calculate the Binding Authorization Data option field of the early PBU message with the temporary home keygen token, and the care-of keygen token may be set to zero. If the MAG has the permanent home keygen token, the MAG may calculate the Binding Authorization Data option field of the early PBU message using the permanent home keygen token, and the care-of keygen token may be set to zero. In such a case, no CGA parameters and/or signature option may be required.

The IPv4 MNs and CNs may calculate the parameters and security tokens (e.g. the home keygen and care-of keygen tokens) as if they were IPv6-enabled nodes. For example, the MNs and CNs may calculate the parameters and security tokens used in PMIPv6 route optimization procedure by using the HNP and interface identifiers for IPv6 nodes. In a specific embodiment, the tokens may be calculated as described in Arkko, et al., "Enhanced Route Optimization for Mobile IPv6," IETF Network Working Group Request for Comments (RFC) 4866, May 2007 (hereinafter Arkko), and the CGA parameters may be calculated as described in Aura, "Cryptographically Generated Addresses," IETF Network Working Group RFC 3972, March 2005 (hereinafter Aura), both of which are incorporated herein by reference in its entirety.

In response to the early PBU message, the CN may send a Proxy Binding Acknowledgement (BAck) message to the MAG at 704. The proxy BAck message may comprise the CoT option, which may comprise the care-of keygen token. A complete PBU message exchange may occur after the PBAck message is received. Specifically, the MAG may send a PBU message to the CN, where the PBU message may comprise the CGA parameters and the signature option. The CN may authenticate the PBU message using both the temporary home keygen token and the care-of keygen token generated during the PCoT procedure 700. The CN may also validate the proxy BCE created by the early PBU exchange and then send a complete PBAck message to the MAG as a reply. The complete PBAck message may comprise the permanent home keygen token. In addition, the MAG may add the permanent home keygen token to the Binding Update (BU) list entry for the CN.

Some or all of the PBU and PBAck messages may be IPv4 packets. Specifically, the PBU message may comprise an IPv4 header comprising the CN's IPv4 address as the destination address and the MN's IPv4 HoA as the source address. The PBU message may also comprise a payload comprising the PBU mobility options. Similarly, the PBA message may comprise an IPv4 header comprising the MN's IPv4 HoA as the destination address and the CN's IPv4 address as the source address. The PBA message may also comprise a payload comprising the PBA mobility options.

When handoff occurs, the proxy CoA changes. As such, the CN must re-verify the reachability of HoA. As such, the new MAG may initiate the PHoT procedure. After the handover home keygen token is transferred from the previous MAG to the new MAG, the permanent home keygen token generated after the HoT may be used to authenticate the early PBU that originated from the new MAG. A PCoT procedure may also be implemented when MN moves into the new MAG. Such a process may be implemented concurrently with the PHoT procedure, if desired. In addition, the PCoT messages may be piggybacked onto the early PBU exchange to prevent handoff latency. As handoff occurs, the new MAG calculates the Binding Authorization Data option for early PBU based on the permanent home keygen token. The new MAG and CNs can resume communication, while PCoT procedure proceeds.

Figure 6:
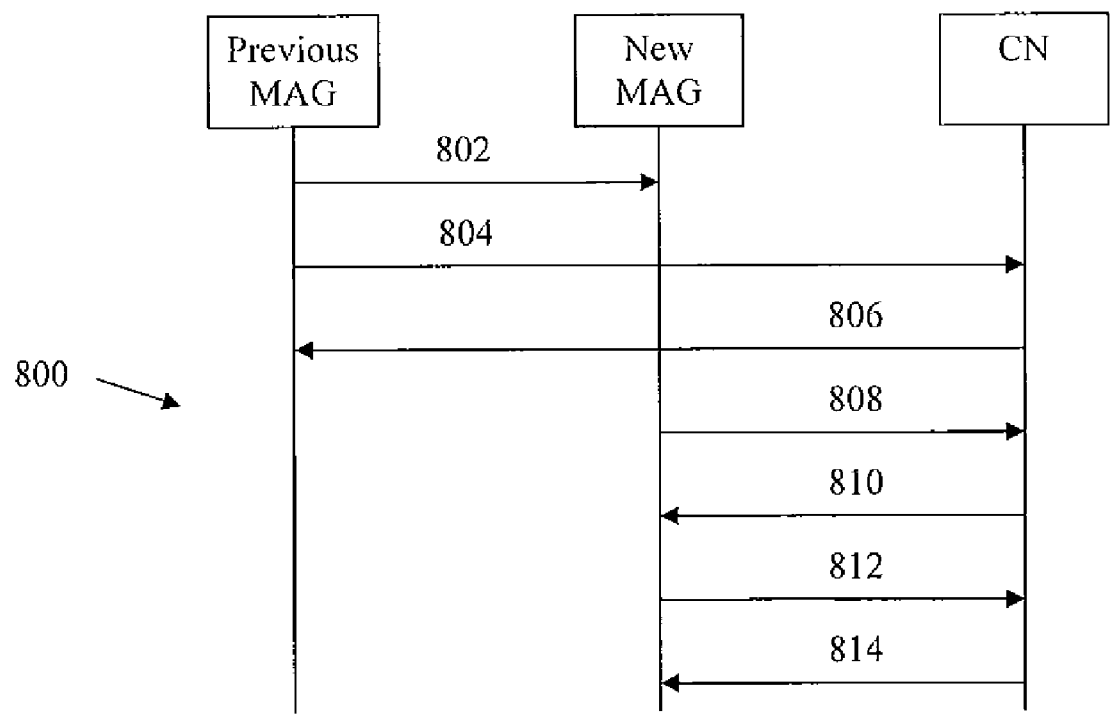
FIG. 6 is a protocol diagram of an embodiment of a handover procedure for a MN's MAG communicating with a CN.

FIG. 6 illustrates an embodiment of a handover procedure 800. The handover procedure 800 may begin when the previous MAG suspects a handover of the MN may be necessary, for example via a layer 2 indication. Specifically, the previous MAG may proactively send a handover context message to the new MAG at 802. The handover context message may comprise the HoA (e.g. IPv4-MN-HoA for an IPv4 MN), a HNP, at least one CN address (e.g. the addresses of the CNs that the MN is communication with using PMIPv6 route optimization), the home keygen token, the MN's CGA parameters, MN identifier (ID), interface ID, link layer address, and/or any other pertinent data. These parameters help the new MAG to pass the verification of HoA required by CN. Alternatively, the context can be reactively transferred, for example if the MN accesses the new MAG before the context is transferred. In reactive handover, when the new MAG detects the attachment of the MN, the new MAG requests the private key and other pertinent parameters from the previous MAG if the previous MAG is known. Otherwise, the new MAG obtains the private key during the authentication procedure. In any event, the previous MAG may deregister the BCE from the CN at 804 after the MN has left the previous MAG. For example, the previous MAG may send a PBU with a lifetime of about zero to the CN. The CN may respond with an optional PBAck message at 806, if desired.

The new MAG may then send an early PBU message to the CN at 808. The early PBU message may comprise a CoTI option and a Binding Authorization Data option, which may be calculated using the home keygen token, and the care-of keygen token may be set to about zero. The early PBU may also comprise the CGA parameters, the signature option, the MN's public key, and the private key used to request the care-of keygen token. Upon receipt of the early PBU, the CN may verify (authenticate) it, for example using the home keygen token and the CGA parameters. If the early PBU passes the verification, the CN may respond with a PBAck message comprising a CoT option at 810. In an embodiment, the PBAck message comprises a care-of keygen token that has been encrypted using the new MAG's public key.

The new MAG may then renew the permanent home keygen token via a complete PBU message exchange. Specifically, the new MAG may send a complete PBU to the CN at 812. The complete PBU message may comprise a Binding Authorization Data option that is calculated using both the care-of keygen token and the home keygen token. Such allows the CN to verify the CoA is reachable and authenticate the legitimacy of the MAG that is sending the message on behalf of MN. The complete PBU may also comprise the CGA parameters and the signature option for the new MAG to request the permanent home keygen token from the CN. The CGA provides a strong binding between its interface identifier and the CGA owner's public key. This enables other nodes to securely authenticate the CGA owner.

In response to the PBU message, the CN may send a PBAck message comprising the home keygen token to the new MAG at 814. The CN may authenticate the complete PBU message based on the CGA property of the MN's HoA. If the MAG only has the temporary home keygen token, then the MAG may use it to calculate the Binding Authorization Data option for the complete PBU message. Alternatively, if the MAG has the permanent home keygen token, the MAG may use it to calculate the Binding Authorization Data option. In such a case, the home nonce index may set to about zero. If the permanent home keygen token is required, the permanent home keygen token may be generated and encrypted using the MN's public key. The token may then be transferred from CN to the new proxy MN via the PBAck message. Thus, it may be apparent that after the new MAG obtains the care-of keygen token via the early PBU and PBAck messages described in FIG. 5, the BCE is generated in the CN but remains unverified. When the complete PBU message described in FIG. 6 is received by the CN, the BCE can be verified.

Figure 7:
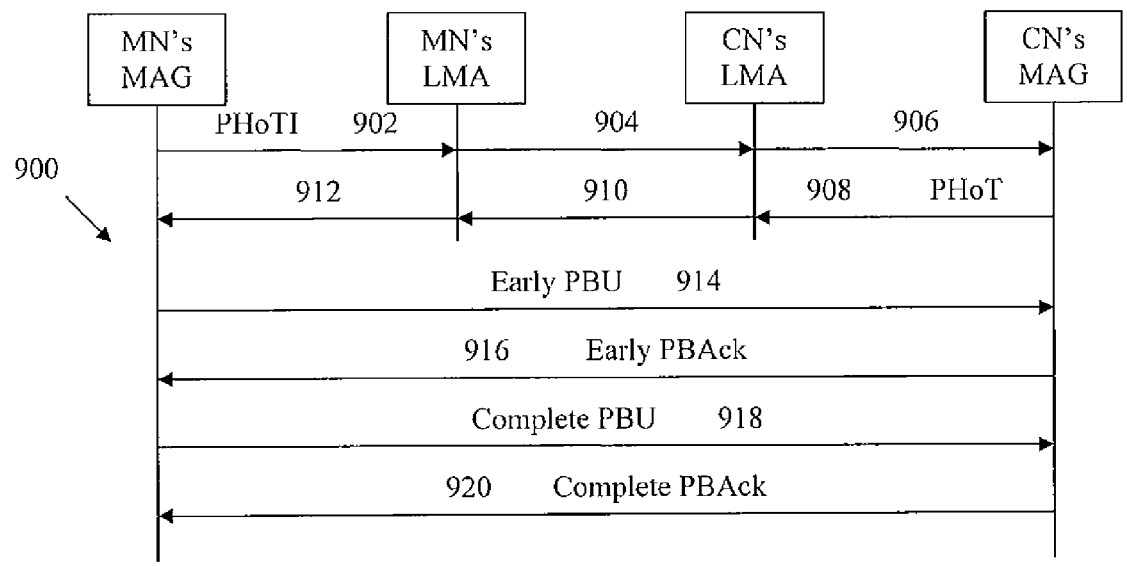
FIG. 7 is a protocol diagram of an embodiment of a route optimization procedure for a MN's MAG communicating with a CN behind another MAG.

If a MAG provides mobility service for the CN, then the PMIPv6 Route Optimization protocol can be used for the CN, provided that the MAG intercepts and processes the route optimization extensions by analyzing the mobility header (MH) types and distinguishing Proxy Mobile IP signaling from normal data. FIG. 7 illustrates an embodiment of a suitable route optimization procedure 900. The route optimization procedure 900 may be implemented when the MN and the CN have different LMAs and different MAGs. The route optimization procedure 900 may begin when the MN's MAG sends a PHoTI message to the MN's LMA at 902, for example using the MAG-LMA tunnel. The PHoTI message may be an IPv6 message, and as such may comprise an IPv6 header comprising the proxy CoA of the CN's MAG, e.g. the IPv6 CoA for the CN, as the destination address and the proxy CoA of the MN's MAG, e.g. the IPv6 CoA for the MN, as the source address. The PHoTI message may also comprise the CN's IPv4 HoA so that the CN's MAG knows which CN is intended to receive the PHoTI. If the MN's MAG and LMA are using IPv4, then the PHoTI message may further comprise an IPv4 header comprising the IPv4 address for the MN's LMA, e.g. the IPv4-LMAA, as the destination address and the IPv4 address of the egress interface of the MN's MAG, e.g. the IPv4-Proxy-CoA, as the source address. In such a case, the MN's LMA may remove the IPv4 header to expose the underlying IPv6 PHoTI message. The MN's LMA may then add an IPv6 header to the PHoTI message, wherein the IPv6 header comprises the IPv6 address for the egress interface of the CN's LMA. The MN's LMA can obtain the IPv6 address for the egress interface of the CN's LMA from the AAA server. The MN's LMA may then forward the PHoTI message to the CN's LMA at 904.

The CN's LMA may remove the outer IPv6 header and expose the original PHoTI message. The CN's LMA may also add an IPv4 header to the PHoTI message, where the IPv4 header comprises the CN's IPv4 Proxy CoA, e.g. the IPv4-Proxy-CoA, as the destination address and the IPv4 address of the CN's LMA, e.g. the IPv4-LMA, as the source address. The CN's LMA may send the PHoTI message to the CN's MAG at 906, for example using the LMA-MAG tunnel.

The CN's MAG may remove the IPv4 header and process the original PHoTI message. Specifically, the CN's MAG may not forward the packet to the CN because the CN's MAG may recognize the packet as a PHoTI message. Instead, the CN's MAG may extract the MN's HoA and CoA from the PHoTI message, for example from the IPv4 HoA and CoA fields. The CN's MAG may also create a BU List entry for the MN. In addition, the CN's MAG may send a PHoT message to the CN's LMA at 908, for example using the LMA-MAG tunnel. The PHoT message may be an IPv6 packet, and may comprise the Proxy-CoA of MN's MAG as the destination address and the Proxy-CoA of CN's MAG as the source address. The PHoT message may also comprise the CN's CoA and the MN's IPv4 HoA, for example in the CoA and IPv4 HoA fields, respectively. The CN's LMA may forward the PHoT message to the MN's LMA at 910, and the MN's LMA may forward the PHoT message to the MN's MAG at 912, for example using the LMA-MAG tunnel. The MN's MAG may extract the CN's CoA from the PHoT message and add such to the CN's BCE.

The MN's MAG and the CN's MAG may then implement the PBU messaging described above. Specifically, the MN's MAG may start the CoT signaling by sending an early PBU message directly to the CN's MAG at 914, and the CN's MAG may respond with an early PBAck message sent directly to the MN's MAG at 916. The MN's MAG may then send a complete PBU message directly to the CN's MAG at 918, and the CN's MAG may respond with a complete PBAck message sent directly to the MN's MAG at 920. In some embodiments, the CoT signaling in FIG. 7 may not be implemented simultaneously with the HoT signaling due to the address exchanges in the PHoTI and PHoT messages.

When both the MN and CN are served by MAGs, the route optimization packets may be IPv6 packets even if the MN, CN, or both only support IPv4. Such may be possible when the two MAGs support IPv6 because the route optimization packets do not reach the MN or CN.

When the MN and LMA have separate LMAs and MAGs and handover is required, the context may be transferred between the MAGs, as described herein. In such a case, the context may comprise the MN's HoA (e.g. the IPv4-MN-HoA for IPv4 nodes), at least one CN address (e.g. the IPv4 Addresses of all the CNs with which the MN is communicating using route optimization), the home keygen token, and the MN's CGA parameters, such as the MN's private key, HNP, home keygen token, MN-ID, interface ID and/or link layer address.

Figure 8:
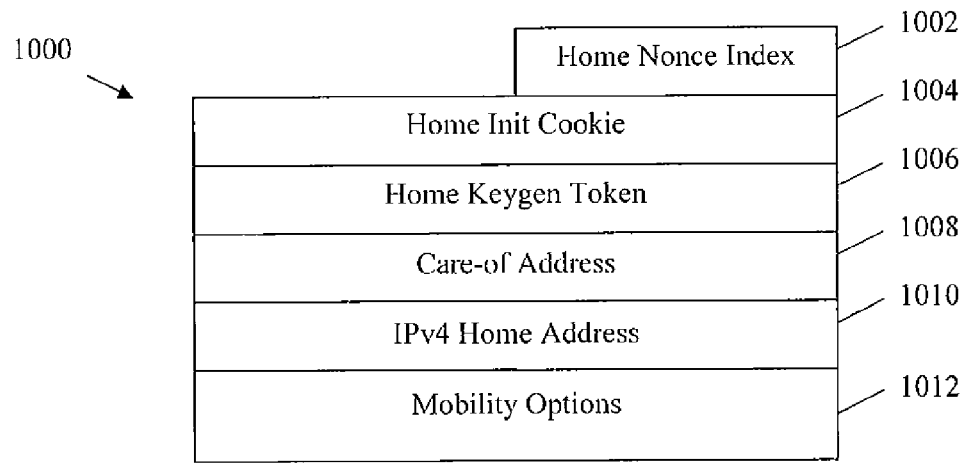
FIG. 8 is a schematic diagram of an embodiment of a PHoT message.

FIG. 8 is an illustration of an embodiment of the PHoT message 1000. The PHoT message 1000 may comprise a home nonce index 1002, a home init cookie 1004, a home keygen token 1006, a CoA 1008, an IPv4 HoA 1010, and any mobility options 1012, which are arranged as shown in FIG. 8. The home nonce index 1002 may tell the CN which nonce value to use when producing the home keygen token 1006, and may be the first about 16 bits of the PHoT message 1000. The home init cookie 1004 may be a random value used to match the PHoTI message with the corresponding PHoT message, and may be the subsequent about 64 bits of the PHoT message 1000. The home keygen token 1006 may be a token used to authenticate the PBU, and may be the subsequent about 64 bits of the PHoT message 1000. The CoA 1008 may be the CoA assigned to the CN by the MAG, and may be the subsequent about 128 bits of the PHoT message 1000. The IPv4 HoA 1010 may be the IPv4 HoA of the MN, and may be the subsequent about 32 bits of the PHoT message 1000. The mobility options 1012 are optional, may be any of the mobility options described in Johnson, et al., "Mobility Support in IPv6," IETF Network Working Group RFC 3775, June 2004 (hereinafter Johnson), which is incorporated herein by reference in its entirety, or any other mobility options, and may be the subsequent (32*n) bits of the PHoT message 1000, where n is a positive integer.

Figure 9:
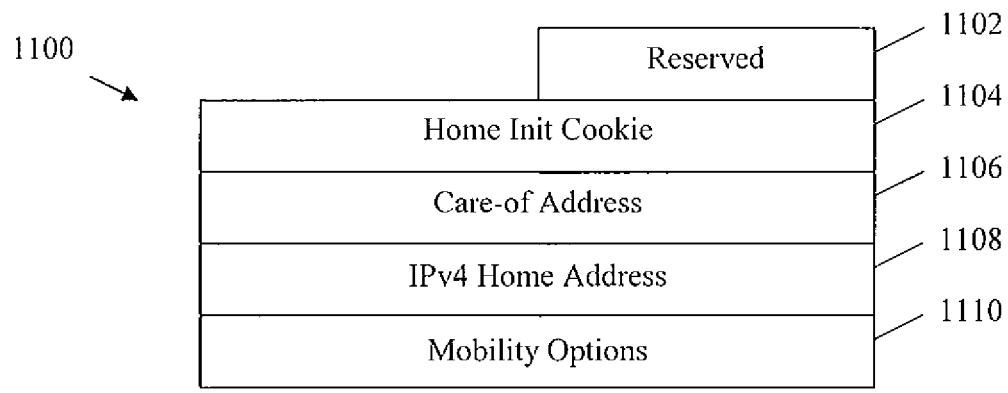
FIG. 9 is a schematic diagram of an embodiment of a PHoT init (PHoTI) message.

FIG. 9 is an illustration of an embodiment of the PHoTI message 1100. The PHoTI message 1100 may comprise a reserved field 1102, a home init cookie 1104, a CoA 1106, an IPv4 HoA 1108, and any mobility options 1110 arranged as shown in FIG. 9. The reserved field 1102 may be reserved for other purposes, and may be the first about 16 bits of the PHoTI message 1100. The home init cookie 1104 may be a random value used to match the PHoTI message with the corresponding PHoT message, and may be the subsequent about 64 bits of the PHoTI message 1100. The CoA 1106 may be the CoA assigned to the MN by the MAG, and may be the subsequent about 128 bits of the PHoTI message 1100. The IPv4 HoA 1108 may be the IPv4 HoA of the MN, and may be the subsequent about 32 bits of the PHoTI message 1100. The mobility options 1110 are optional, may be any of the mobility options described in Johnson or any other mobility options, and may be the subsequent (32*n) bits of the PHoTI message 1100, where n is a positive integer.

Figure 10:
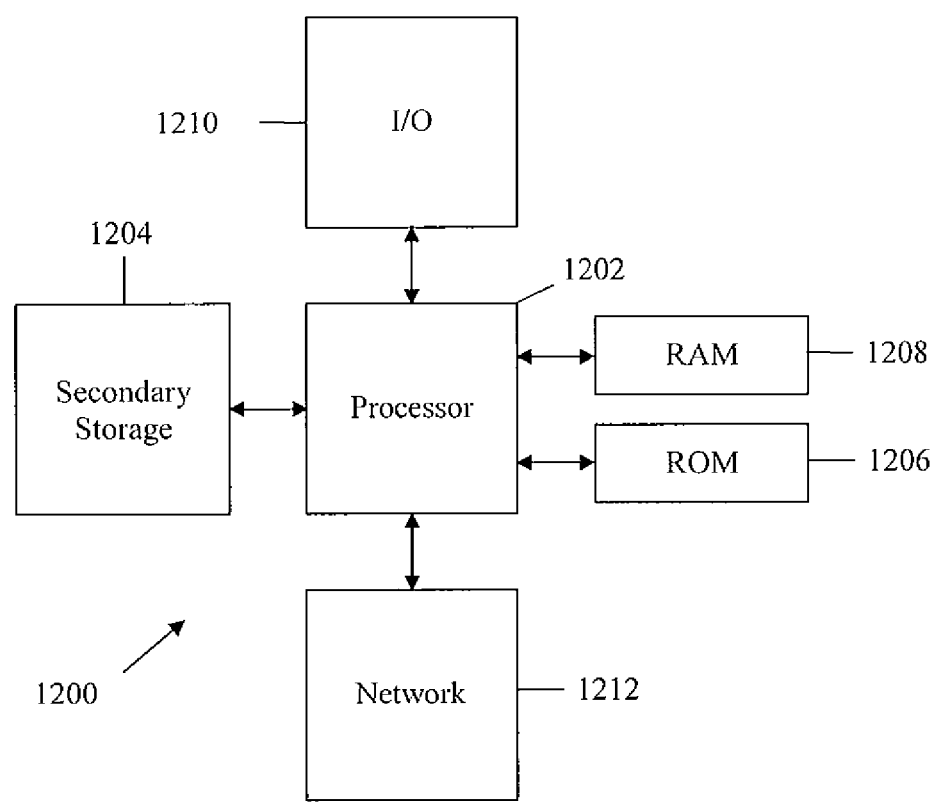
FIG. 10 is an illustration of an embodiment general-purpose computer system.

The network components described above may be implemented on any general-purpose network component, such as a computer or network component with sufficient processing power, memory resources, and network throughput capability to handle the necessary workload placed upon it. FIG. 10 illustrates a typical, general-purpose network component 1200 suitable for implementing one or more embodiments of the components disclosed herein. The network component 1200 includes a processor 1202 (which may be referred to as a central processor unit or CPU) that is in communication with memory devices including secondary storage 1204, read only memory (ROM) 1206, random access memory (RAM) 1208, input/output (I/O) devices 1210, and network connectivity devices 1212. The processor 1202 may be implemented as one or more CPU chips, or may be part of one or more application specific integrated circuits (ASICs).

The secondary storage 1204 is typically comprised of one or more disk drives or tape drives and is used for non-volatile storage of data and as an over-flow data storage device if RAM 1208 is not large enough to hold all working data. Secondary storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of secondary storage 1204. The RAM 1208 is used to store volatile data and perhaps to store instructions. Access to both ROM 1206 and RAM 1208 is typically faster than to secondary storage 1204.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers, as defined in the above, is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
   at least one processor configured to:
   optimize a communications route associated with a mobile node (MN) and a correspondent node (CN) using a proxy care-of test (PCoT) procedure comprising Internet Protocol (IP) version 4 (IPv4) signaling, wherein the communications route is optimized without signaling the MN,
   wherein the network component is a mobility access gateway (MAG) that serves the CN, and
   wherein optimizing the communications route comprises:
   receiving an early proxy binding update (PBU) from a second MAG serving the MN, wherein the early PBU comprises a Care-of-Test (CoT) init (CoTI) option; and
   sending a proxy binding acknowledgment (PBAck) to the second MAG, wherein the PBAck comprises a care-of-keygen token, and
   wherein the early PBU and the PBAck are not received by the MN.

2. A network component comprising:
   at least one processor configured to:
   optimize a communications route associated with a mobile node (MN) and a correspondent node (CN) using a proxy care-of test (PCoT) procedure comprising Internet Protocol (IP) version 4 (IPv4) signaling, wherein the communications route is optimized without signaling the MN,
   wherein the network component is the CN, wherein the CN is not served by a mobility access gateway (MAG), and wherein optimizing the communications route comprises:
   receiving an early proxy binding update (PBU) from a MAG serving the MN, wherein the early PBU comprises a Care-of-Test (CoT) init (CoTI) option; and
   sending a proxy binding acknowledgment (PBAck) to the second MAG, wherein the PBAck comprises a care-of-keygen token, and
   wherein the early PBU and the PBAck are not received by the MN.

3. A network comprising:
   a mobility access gateway (MAG) in communication with a mobile node (MN); and
   a correspondent node (CN) in communication with the MAG and that desires to communicate with the MN,
   a first local mobility anchor (LMA) in communication with the MAG and the CN;
   a second LMA in communication with the LMA; and
   a second MAG in communication with the CN and the second LMA,
   wherein a communications route between the MN and the CN is optimized using a proxy care-of test (PCoT) procedure comprising Internet Protocol (IP) version 4 (IPv4) signaling, wherein the communications route is optimized without signaling the MN, wherein optimizing the communications route further comprises using a proxy home test (PHoT) procedure comprising IPv4 signaling, wherein the LMA and the MAG are associated with the MN, wherein the second LMA and the second MAG are associated with the CN, wherein the MAG, the first LMA, the second LMA, and the second MAG participate in the PHoT procedure, and wherein the first LMA and the second LMA do not participate in the PCoT procedure.

4. The network component of claim 1, wherein optimizing the communications route further comprises using a proxy home test (PHoT) procedure comprising IPv4 signaling, wherein the PHoT procedure is performed concurrently with the PCoT procedure.

5. The network component of claim 4, wherein the PHoT produces a permanent home keygen token and the PCoT produces a care-of keygen token, and wherein the PCoT creates a temporary home keygen token when the permanent home keygen token is unavailable.

6. The network of claim 3, wherein the proxy care-of test (PCoT) procedure comprises an early proxy binding update (PBU) message and a proxy binding acknowledgment (PBAck) message.

7. The network of claim 6, wherein the early PBU message comprises a PCoT init option and the PBAck message comprises a PCoT option.

8. The network of claim 7, wherein the PCoT procedure further comprises a complete PBU message and a second PBAck message comprising a home keygen token.

9. The network of claim 3, wherein the PHoT procedure comprises a PHoT Init (PHoTI) message and a PHoT message.

10. The network of claim 9, wherein the PHoTI message comprises a home init cookie, a care-of address (CoA), and an IPv4 home address.

11. The network of claim 9, wherein the PHoT message comprises a home nonce index, a home init cookie, a care-of address (CoA), and an IPv4 home address.

12. An apparatus comprising:
a processor coupled to a memory and configured to:
perform a proxy care-of test (PCoT) procedure and/or a proxy home test (PHoT) procedure to optimize a communications route between a mobile node (MN) and a correspondent node (CN), wherein neither the PCoT procedure nor the PHoT procedure comprise signaling the MN, wherein the PCoT procedure is performed to validate the MN's care-of-address (CoA), and wherein performing the PCoT procedure comprises:

sending an early proxy binding update (PBU) to either the CN or the CN's media access gateway (MAG), wherein the early PBU comprises a Care-of-Test (CoT) init (CoTI) option; and receiving a proxy binding acknowledgment (PBAck) from either the CN or the CN's MAG, wherein the PBAck comprises a care-of-keygen token, and wherein the early PBU and the PBAck are not received by the MN.

13. The apparatus of claim 12, wherein the PHoT procedure is performed to validate the MN's home-of-address (HoA), and wherein performing the PHoT procedure comprises:

sending a PHoT init (PHoTI) message to the CN via an intermediate local mobility anchor (LMA); and receiving a PHoT message from the CN via the intermediate LMA, wherein the PHoT message comprises a permanent home keygen token.

14. The apparatus of claim 12, wherein the processor performs the PCoT procedure and/or PHoT procedure in response to a handover between two mobility access gateways.

15. The apparatus of claim 14, wherein the processor is further configured to: receive a handover context message from a mobility access gateway (MAG) or a local mobility anchor (LMA), and wherein the handover context message comprises: an IPv4 MN home address; an IPv4 address for each correspondent node (CN) with which the MN has existing optimized routes; and an IPv4 proxy care-of address for any MAGs associated with the existing optimized routes.

* * * * *